United States Patent [19]
Campbell

[11] 4,010,516
[45] Mar. 8, 1977

[54] FISH SCALING DEVICE

[76] Inventor: Rayburn J. Campbell, P.O. Box 1475, Pearland, Tex. 77581

[22] Filed: Sept. 16, 1975

[21] Appl. No.: 613,930

[52] U.S. Cl. ................................. 17/66; 17/68
[51] Int. Cl.² ................................. A22C 25/02
[58] Field of Search ............. 17/68, 66, 67, 69, 19, 17/64; 15/236 R, 104.16, 104.19

[56] References Cited
UNITED STATES PATENTS

| | | | |
|---|---|---|---|
| 2,285,567 | 6/1942 | Carroll | 15/236 RX |
| 2,338,647 | 1/1944 | Koon | 15/236 R |
| 2,510,371 | 6/1950 | Blatt | 17/68 |
| 2,516,414 | 7/1950 | Pillod | 17/68 |
| 3,127,634 | 4/1964 | Ferguson | 17/66 |
| 3,670,364 | 6/1972 | Bradley | 17/66 |

FOREIGN PATENTS OR APPLICATIONS 13,772  9/1911  United Kingdom ............... 17/19

Primary Examiner—Louis G. Mancene
Assistant Examiner—James D. Hamilton
Attorney, Agent, or Firm—Gardiner, Sixbey, Bradford & Carlson

[57] ABSTRACT

A fish scaler comprises a specimen hold down plate and a scaler plate moveable toward and away from the hold down plate to and fro on a handle attached to the hold down plate and including manually operable scaler plate operating structure to guide the scaler plate on the handle and comprising an operating handle of modified oval-conical configuration to permit the scaler plate to have perpendicular as well as rotatable motion with respect to the guiding handle.

4 Claims, 4 Drawing Figures

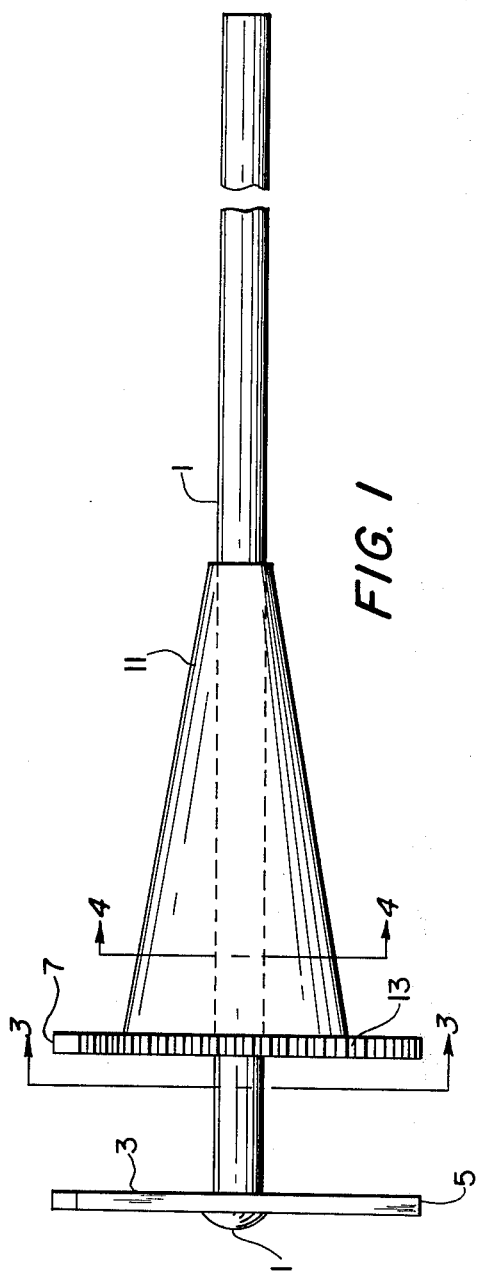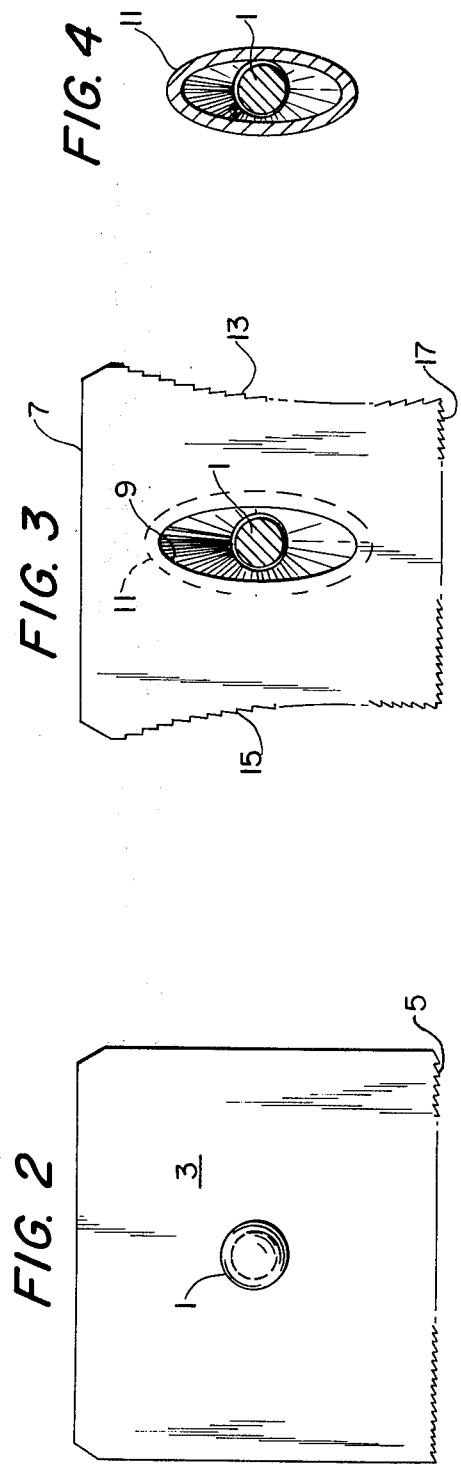

FISH SCALING DEVICE

BACKGROUND

The scaling of fish has long been acknowledged as a distasteful undertaking by many fisherman. The usual procedure is to grasp the tail of the fish with one hand with the catch resting on a flat surface, the carcass is scrapted with a knife from tail to head to flake off the covering of scales. Usually the scales snap loose in a shower of particles which soon covers the hands and the area surrounding the operation. Subsequent clean up of the loosened scales is a very tedious job that is made more distasteful by the fish odor which is carried by the scales and is transferred to the body of the person performing the scaling operation.

Many devices have been devised in an effort to facilitate scaling of fish quickly, easily and with a minimum of mess. One such device consists of a handle having means at one end which is adapted to be placed on the tail of the specimen to hold it firmly on a suitable supporting surface. A rake like scaling means is affixed to the handle for sliding motion. When the rake like member is advanced toward the tail of the specimen the handle is lifted to bring the rake-like means out of contact with the specimen until it is in its foremost position against the hold down means. The handle is then lowered to bring the rake-like scaling means into contact with the specimen and operated away from the hold down means to loosen the scales from the specimen's flesh. This is a very cumbersome operation and the purpose of the present invention is to improve the prior art device both as to ease of operation and effectiveness of function.

THE INVENTION

As shown in the attached drawing wherein

FIG. 1 is a side elevational view of the improved scaling device.

FIG. 2 is an end view of the hold down end of the device

FIG. 3 is an elevational sectional view taken along the line 3—3 of FIG. 1 and

FIG. 4 is a sectional view taken along the line 4—4 of FIG. 1, the scaler is comprised of an elongated, preferably cylindrical handle 1. Attached to one end of the handle, the left-hand end as shown in FIG. 1 is a plate-like hold down means 3 having a lower cerrated edge 5.

Slidably mounted on handle 1 is the scaling means comprised of a scaler plate 7 having an oval opening 9 therein, said opening having its longer axis lying in a vertical plane as shown in FIG. 3.

Attached to the scaling plate 9 is a generally funnel shaped operator 11 having an oval cross section, as shown in FIG. 4, tapering down toward the handle 1. Thus, the operation movable to and fro along the handle toward and away from the hold down plate 3. At the same time the operator and scaler plate are free to move in a generally vertical arcuate path whereby as the scaling plate moves over the carcass of a fish it can pivot upwardly to accomodate the thickness of the specimen which is not constant from tail to head and at the same time when the scaling plate is being returned to its starting position adjacent the hold down plate it is not necessary to move or lift handle 1 because the shape of the operator readily facilitates raising of the scaler plate to accomodate this return stroke.

As shown in FIG. 3, the scaler plate has three serated edges 13, 15 and 17 with the edges 15 and 17 being of generally arcuate shape. Thus by rotating the operator in either direction the arcuate edge 13 or 15 can be brought into play to reach curved portions of the carcass which might otherwise not be scaled using the straight edge 17 of the scaler plate 7.

Thus there is disclosed a fish scaling device which is easy to use and will perform the desired function in a manner much improved over the known prior art devices, hence,

What is claimed is:

1. A fish scaling device comprising an elongated, cylindrical handle, a generally rectangular hold down plate affixed to one end of said handle and perpendicular thereto; a scaler plate slidably mounted on said handle for reciprocating movement along said handle; manually operable operator means connected to said scales plate whereby said scaler plate may be moved to and fro along said handle, said operator being of generally funnel-shaped configuration flaring open toward said scaler plate and being oval in cross section, said scaler plate having an oval opening therein with the longer axis of the opening being aligned with the longer axis of the oval, funnel-shaped end of the operator whereby said operator and said scaler plate may be swung in a generally arcuate path in at least one direction to accommodate variations in thickness and contour of the specimens being scaled as the operator traverses to and fro along said elongated, cylindrical handle.

2. A fish scaler device as defined in claim 1 wherein said scaler plate is provided with three serrated edges.

3. A fish scaling device as defined in claim 2 wherein at least the two side serrated edges of the scaler plate are generally arcuate in configuration.

4. A fish scaler device as defined in claim 1 wherein said hold down plate is provided with a lower serrated edge.

* * * * *